(12) United States Patent
Wieck et al.

(10) Patent No.: US 7,160,594 B2
(45) Date of Patent: Jan. 9, 2007

(54) PROTECTIVE MATERIAL WITH PUNCHED SHAPED PARTS

(75) Inventors: Andreas Wieck, Halstenbek (DE); Reinhard Storbeck, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 10/081,616

(22) Filed: Feb. 21, 2002

(65) Prior Publication Data

US 2002/0160140 A1    Oct. 31, 2002

(30) Foreign Application Priority Data

Feb. 27, 2001    (DE)    ................. 101 09 396

(51) Int. Cl.
*B32B 9/00* (2006.01)
*B32B 33/00* (2006.01)
*B29C 65/00* (2006.01)
*B42D 15/00* (2006.01)

(52) U.S. Cl. ............ 428/40.1; 428/40.8; 428/41.4; 428/41.6; 428/42.1; 428/42.3; 156/250; 283/101

(58) Field of Classification Search ........... 428/40.1, 428/40.8, 41.4, 41.6, 42.1, 42.3; 156/250; 283/81, 101
See application file for complete search history.

(56) References Cited

U.S. PATENT DOCUMENTS 4,507,166 A * 3/1985 Posner .............. 156/235
5,250,336 A * 10/1993 Greuse et al. ............ 428/40
5,932,352 A * 8/1999 Higgins .............. 428/423.1

FOREIGN PATENT DOCUMENTS

CA    1320179    7/1993
DE    1 052 611    3/1959

OTHER PUBLICATIONS

Cinergy Glossary of Terms, reprinted Jun. 20, 2004 at http://www.cinergy.com/standards/glossary.htm.*

* cited by examiner

*Primary Examiner*—Nasser Ahmad
*Assistant Examiner*—Patricia Nordmeyer
(74) *Attorney, Agent, or Firm*—Norris McLaughlin & Marcus, PA

(57) ABSTRACT

A protective material with punched shaped parts, obtainable in a converting process for producing single-sidedly or double-sidedly adhesive punched shaped parts, there being placed atop the protective material a single-sidedly or double-sidedly adhesive tape from which punched shaped parts are punched out by means of punching tools, in particular by the kiss-cut process, wherein
the protective material comprises a backing sheet in the form of a colored polymer backing possessing essentially a top and a bottom face, the coloring being obtained by means of colorants in the interior of the backing sheet which do not give rise to any abrasive action on the punching tools,
or wherein the backing sheet in the protective material in this case is a polymer backing which has essentially a top and a bottom face, with a color layer applied to the top and/or the bottom face of the polymer backing.

13 Claims, 1 Drawing Sheet

PROTECTIVE MATERIAL WITH PUNCHED SHAPED PARTS

BACKGROUND OF THE INVENTION

The invention relates to a protective material with punched shaped parts obtainable in a converting process for producing single-sidedly or double-sidedly adhesive punched shaped parts, there being placed atop the protective material a single-sidedly or double-sidedly adhesive tape from which punched shaped parts are punched out by means of punching tools, in particular by the kiss-cut process, and also to the use of a polymer backing for a protective material of this kind.

Parts which are to be fastened by means of double-sided adhesive tape (for example, electronic components or seals in mobile telephones) require the use, depending on the particular application, of double-sidedly adhesively punched parts. These punched parts have to be converted into the required form beforehand in a punching process, particularly by the process known as kiss cutting, which in turn requires the adhesive tape that is present for producing the punched parts to be protected beforehand with a material having antiadhesive properties. To produce punched parts which are composed of the adhesive tape individually or, by lamination, of a composite with particularly hard, inflexible materials such as, for example, polyester, it is preferred to use a likewise hard, inflexible backing sheet as the protection. This removes the possibility of the backing sheet yielding under the developing pressure of the punching dies during penetration of hard punched shaped parts, and the punching dies penetrating too greatly into the backing sheet.

A feature of the kiss-cut process is that, during punching, the material which has antiadhesive properties is injured or punched very little if at all.

For the dispensing procedure of the punched shaped parts, it is common—depending on the guiding process—to use transparent or opaque polyester films as the hard backing sheet. When opaque polyester backing sheets are used, guiding can be carried out by means of optical recognition systems such as, for example, light barrier advance systems in conjunction with holelike notches in the edge region of the backing sheet.

The opacity of the polyester film is normally brought about by homogeneous incorporation of pigmentary fillers such as, for example, carbon black or titanium dioxide into the polyester. In general, depending on the recognition method of the punched shaped parts on the backing sheet in the guiding process, transparent white- or black-colored polyester backing sheets are employed, the backing sheet filled with the white pigment titanium dioxide having the disadvantage that the punching dies are subject to severe abrasion, leading to more frequent and costly reworking and changing of the punching die. On the other hand, black-colored polyester backings may, because of the carbon black fraction, alter the electrical conductivity properties of the backing web and cause faults in the recognition systems.

It is an object of the invention to provide an opaque polymer backing sheet, suitable for web edge guided optical recognition systems, for converting and dispensing adhesive punched shaped parts, which owing to the nature of its coloring prevents abrasion of the punching dies or changes in the electrical conductivity of the backing sheet.

BRIEF SUMMARY OF THE INVENTION

This object is achieved by the use of a particularly homogeneously colored polymer backing and, respectively, by the use of a color-printed polymer backing as the backing sheet in a protective material for an adhesive tape.

Accordingly, a first embodiment of the invention provides a protective material with punched shaped parts, obtainable in a converting process for producing single-sidedly or double-sidedly adhesive punched shaped parts, there being placed atop the protective material a single-sidedly or double-sidedly adhesive tape from which punched shaped parts are punched out by means of punching tools, in particular by the kiss-cut process. The protective material comprises a backing sheet in the form of a colored polymer backing possessing essentially a top and a bottom face, the coloring being obtained by means of colorants in the interior of the backing sheet which do not give rise to any abrasive action on the punching tools.

The coloring of the polymer backing is brought about by means of colorants which are present within the interior of the backing. These colorants are preferably admixed to the monomer mixture or to the polymer during the production of the backing material. The colorants are chosen so as not to possess any damaging action for the punching tool; in particular, the presence of titanium dioxide as a pigmentary colorant should be ruled out.

The achievement of the object in accordance with the same inventive teaching produces a second embodiment of the invention, likewise comprising a protective material with punched shaped parts, obtainable in a converting process for producing single-sidedly or double-sidedly adhesive punched shaped parts, there being placed atop the protective material a single-sidedly or double-sidedly adhesive tape from which punched shaped parts are punched out by means of punching tools, in particular by the kiss-cut process. The backing sheet in the protective material in this case is a polymer backing which has essentially a top and a bottom face, with a color layer applied to the top and/or the bottom face of the polymer backing.

The coloring of the backing sheet or, respectively, the application of the color layer ensures sufficient optical contrast which makes it possible to guide optical recognition systems during the punching process.

Within the meaning of the invention, a dark backing sheet or a subregionally (in the region of the guidance systems) colored backing sheet is used which is marked in certain areas, in particular on its side edges, with holes, notches or the like. The guidance systems comprise in particular a light beam which scans the backing sheet in the region of the marks. As a result of the contrast between dark (colored) areas and transparent areas, control pulses for the implementation of dispensing procedures are initiated.

For the color layer, it is preferred as aqueous dies to use, in particular, cationic color systems and, as solventborne colors, to use nitrocellulose-based colors in particular. In principle, many other color systems are also suitable. Thus it is possible, for example, to use dyed silicones.

In general, for the second embodiment of the invention it is particularly advantageous if the color layer is applied over the full area of the backing sheet. Within the meaning of the invention, however, it is also possible to apply only a partial color layer which does not cover the entire area of the backing sheet. It is especially advantageous if the backing sheet is provided with color only at its side edges, with the colored strips provided with holes, notches or the like serving as guidance strips for the optical recognition system.

It is also conceivable to apply a lattice print which shows, in particular, the shape of the punchings that are to be punched out.

The color layer may be applied to the backing sheet by printing, spraying, brushing, by flexographic printing by means of gravure role application with doctor blades, by squeezing, or by other suitable techniques.

Unless specified otherwise, the further developments of the invention that are set out hereinbelow relate to both embodiments.

Of particular advantage for the invention is the use of a polyester backing as the backing sheet. Polyester has the advantage that, first, it has sufficient hardness for the punching process and, secondly, it can be prepared in such a way that there are only slight fluctuations in its thickness. In principle, however, all other plastics known for use as backing sheets are suitable, such as polystyrene, polyamide or polyimide, for example.

Where polyester is used the polymer backing very preferably has a thickness of from 12 to 150 µm, in particular from 25 to 75 µm, and very particularly from 36 to 50 µm.

Advantageously, the polymer backing has an antiadhesive coating on the top and/or on the bottom face. In the case of the second embodiment, for the polymer backing already provided on one or two sides with a color layer, the antiadhesive coating may also be applied to the color layer.

Particularly when the protective material is intended to enclose single-sidedly adhesive tapes, it is entirely sufficient for the protective material to be provided with an antiadhesive coating on the side intended for enclosure.

The single-sidedly adhesive coating of the protective material is also sufficient if the single-sidedly adhesive tape is supplied in the form of an assembly, for example, in rolled-up form. Double-sided adhesive tapes, on the other hand, generally need a double-sided antiadhesive coating.

Furthermore, one advantageous form of the invention comprises the use of antiadhesive coats of, for example, silicone, paraffin, Teflon or waxes. In this case it is possible to use silicone-free release layers, such as "nonsilicone" from Rexam, or low-silicone release layers, for example "Lo ex" from Rexam.

Depending on the specific application of the release material of the invention it is possible to design the antiadhesive layers with the same or different release on either side of the release material, i.e., to set different release properties on either side (controlled release).

Preference is given to using solventlessly coated silicone.

With further preference, the solventlessly coated silicone is applied at from 0.5 to 3.7 $g/m^2$, preferably from 1.0 to 3.0 $g/m^2$, with very particular preference from 1.5 to 2.5 $g/m^2$.

However, solventborne systems are also possible, at an application rate in particular of from 0.3 to 1 $g/m^2$.

This ensures that the protective material with full-area backing
- acts as an abrasion-friendly material with respect to the punching dies
- can be used as a hard, inflexible backing sheet for hard punched shaped parts in the kiss-cut process
- and can be used for the dispensing function of the punched shaped parts by way of recognition by optical systems in conjunction with notches in the sheet edge region.

In the case of the second embodiment of the invention, it is very advantageous to provide the protective tape on one side with a color layer and on the same side with an antiadhesive coating. It is advantageous if the color layer is present on the side of the protective material that faces the adhesive tape.

With particular preference, the color layer is applied to the polymer backing at from 0.5 to 20 $g/m^2$, preferably from 4 to 8 $g/m^2$, very preferably from 5 to 7 $g/m^2$.

The embodiment provided with the color layer has a number of advantages over the intrinsically colored protective tape. For instance, commercially available polymer sheets can be treated retrospectively without great technical effort by applying the color layer. If the color layer is applied to the full area of that side of the protective material that faces the adhesive tape, then it is of particular advantage for the optical guiding of the recognition systems in the punching process. It is further of advantage here to give the color layer a single color, in particular with a color which produces a particularly high optical contrast from the holes or notches.

On the other hand, the coating of the backing tape with color allows indicia, pictures or other representations to be applied. To this end, the color layer may be made multicolored or may be applied only to subregions of the tape, provided that the guiding of the recognition systems is ensured. In this way the protective tape may serve, for example, as an advertizing medium.

The protective material with double-sidedly adhesive punched shaped parts is preferably used for adhesive bonding of components in electronic devices such as telephones, especially mobile telephones.

In principle, all kinds of single-sidedly or double-sidedly coated adhesive tapes are suitable as base materials for the adhesive punchings, with paper, nonwovens and plastics of a very wide variety of kinds being possible backing material sheets for them.

With further preference, the adhesive tape has a thickness of from 20 to 320 µm, more preferably from 80 to 260 µm, with very particular preference from 130 to 210 µm.

As adhesive compositions for the adhesive tapes it is possible to use all pressure sensitive adhesive compositions, such as are mentioned, for example, in SATAS, Handbook of Pressure Sensitive Adhesive Technology, Third Edition. Particularly suitable are natural/synthetic rubber-based and acrylate-based adhesive compositions which can be applied from the melt or from solution.

The opaque backing sheet with antiadhesive treatment that is used in accordance with the invention and is intrinsically colored or is provided with one or more colors by printing or otherwise over its full area or its subregions is outstandingly suitable for the converting process of adhesive punched shaped parts and for the light barrier controlled dispensing process of the shaped parts, owing to the use of nonabrasive colorants to produce the opacity.

Finally, the concept of the invention embraces the use of a polymer backing, particularly a polyester backing, as backing sheet in a protective material for a single-sidedly or double-sidedly adhesive tape, wherein the polymer backing essentially has a top and a bottom face and is provided with a full-area color layer on the top and/or on the bottom face.

DETAILED DESCRIPTION OF THE INVENTION

Figure 1:
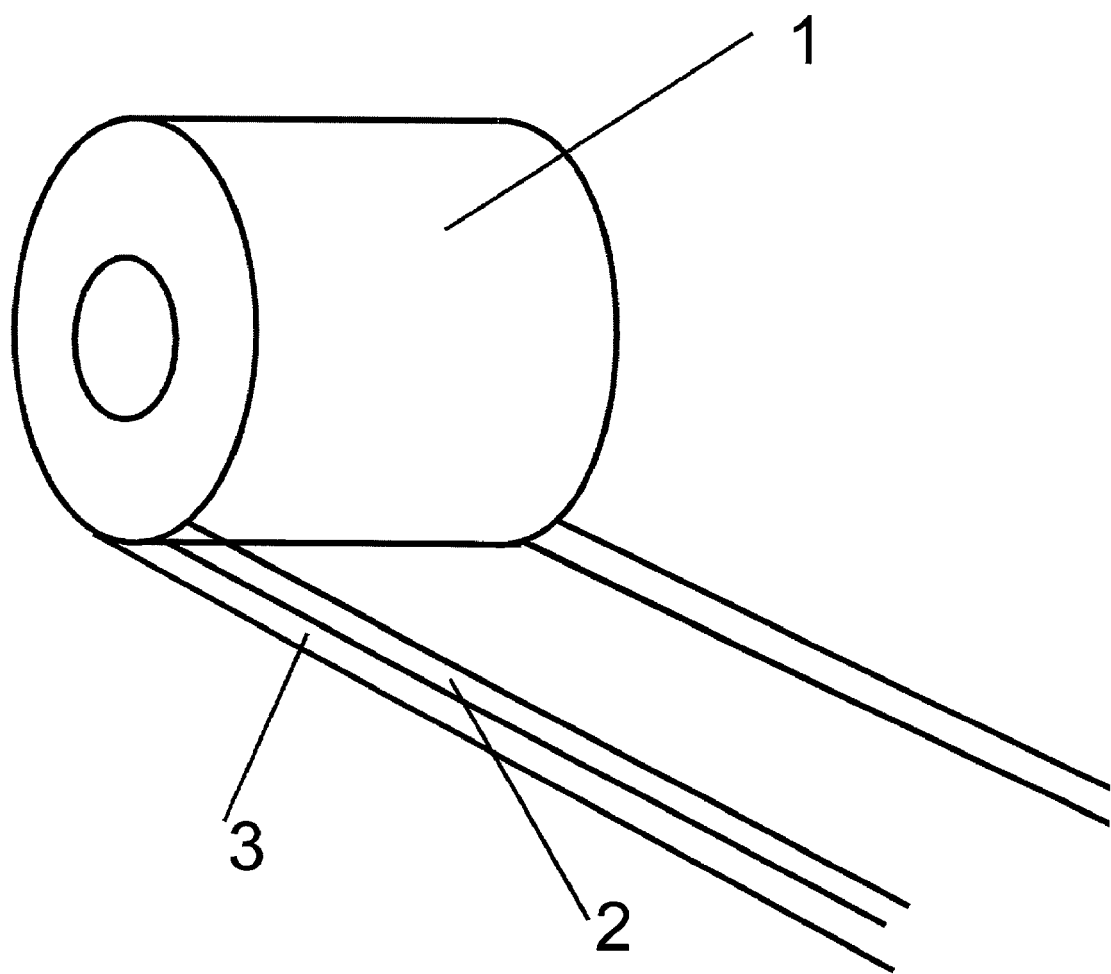
FIG. 1 Illustrates an embodiment of the overall product structure.

FIG. 1 illustrates a roll 1, a product 2 and a protective material 3.

In the test below, on the basis of a FIGURE and of an example, one preferred embodiment of the overall product structure is shown, without being intended to add any restrictive effect whatsoever. The protective material 3, provided double-sidedly with an adhesive coating, is wound to a roll 1 with the punched shaped parts, which are double-sidedly adhesive or have already been produced as an assembly with laminated polymer materials.

After the product has been unwound, the product 2, with single-sided or double-sided adhesion depending on the process, is present on the top face of the antiadhesive release material 3, and the punched shaped parts may be dispensed by way of optical recognition systems and marks in the sheet edge region.

EXAMPLE

The adhesive tape provided with the release material in accordance with the claims may be converted to high-quality punched shaped parts in a rotary punching process. In this process, the adhesive tape is unrolled together with the release material and passed individually, or already as a composite with laminated polymer materials, beneath the rotary punching die by means of a backing roll. In this operation, at the same time, the notches or holes in the edge region of the polyester backing sheet that are necessary with the subsequent dispensing/advancing process using light barrier advance systems are introduced. Depending on the punching geometry, this process produces, on the release material protective covering, shaped parts which following removal and discarding of the residual lattice can be wound up again. Where double-sidedly adhesive punched shaped parts are produced and rolled up, it may be necessary to laminate a second protective covering.

The following constituents are used for an inventive polyester backing and also for the punched parts:

| | |
|---|---|
| Release material protective covering: | 50 μm polyester film printed in green on one side at 6 g/m² about 1.6 g/m² per side of a solvent-free silicon system |
| Adhesive tape: | 48 μm thick adhesive tape with a PTE backing |

The invention claimed is:

1. A protective material with punched shaped parts, manufactured by converting process for producing single-sided or double-sided adhesive punched shaped parts from a single-sided or double sided adhesive tape, wherein the single-sided or double-sided adhesive tape is positioned on top of the protective material, the protective material comprising
   a polymer backing sheet having a top face and a bottom face and an interior portion between the top face and the bottom face,
   only the interior portion includes homogeneous opaque colorant,
   the top and/or the bottom face include anti-adhesive coating, and wherein the shaped parts are punched out from the single-sided or double sided adhesive tape by a punching tool via a kiss-cut process,
and wherein the polymer backing sheet includes means for web edge guided optical recognition for dispensing the punched shaped parts.

2. The protective material as claimed in claim 1, wherein the opaque colorant is applied over the full interior portion of the backing sheet.

3. The protective material as claimed in claim 1, wherein the polymer backing sheet is one of a polyester, polystyrene, polyamide or polyimide.

4. The protective material as claimed in claim 3, wherein the polymer backing sheet is polyester having a thickness of from 12 to 150 μm.

5. The protective material as claimed in claim 4, wherein the opaque polyester backing has a thickness of from about 25 to 75 μm.

6. The protective material as claimed in claim 5, wherein the opaque polyester backing has a thickness of from about 36 to 50 μm.

7. The protective material as claimed in claim 3, wherein the anti-adhesive coating is one of a silicone-free layer, a low-silicone layer, silicone layer, paraffin layer, Teflon layer or a wax layer.

8. The protective material as claimed in claim 1, wherein the opaque colorant is applied to the interior portion of the polymer backing, facing the top/or bottom face of the anti-adhesive coating at from 0.5 to 20 g/m².

9. The protective material as claimed in claim 8, wherein the opaque color is applied to the interior portion of the polymer backing at from about 4 to 8 g/m².

10. The protective material as claimed in claim 9, wherein the opaque color is applied to the interior portion of the polymer backing at from about 5 to 7 g./m².

11. The protective material as claimed in claim 1, wherein the opaque colorant is dyed silicone.

12. A method for using a polymer backing as a protective material for a single-sided or double-sided adhesive tape, tape positioned on top of the polymer backing for dispensing punched shaped parts, comprising the steps of
   providing a polymer backing sheet that includes an interior portion being covered with a top and a bottom face and a homogeneous opaque colorant layer disposed in the interior portion, providing an anti-adhesive coating on the top and/or bottom face
   providing the polymer backing with means for web edge guided optical recognition and dispensing single-sided or double-sided adhesive punched shaped parts from the polymer backing sheet.

13. The method for using the polymer backing of claim 12, wherein the opaque polymer backing is a polyester backing.

* * * * *